United States Patent [19]

Fuchs, Jr.

[11] 4,393,917
[45] Jul. 19, 1983

[54] METHODS AND APPARATUS FOR CASTING AND EXTRUDING MATERIAL

[75] Inventor: Francis J. Fuchs, Jr., Mercer County, N.J.

[73] Assignee: Western Electric Company, Inc., New York, N.Y.

[21] Appl. No.: 248,733

[22] Filed: Mar. 30, 1981

Related U.S. Application Data

[63] Continuation-in-part of Ser. No. 810,457, Jun. 27, 1977, abandoned.

[51] Int. Cl.³ .............................................. B22D 11/12
[52] U.S. Cl. .................... 164/476; 164/461; 164/477; 164/417; 164/429; 164/433
[58] Field of Search ............... 164/427, 429, 433, 479, 164/461, 76.1, 417, 476, 477; 29/527.3, 527.5, 527.7; 425/113, 133.1, 224, 363; 165/DIG. 12, 66

[56] References Cited

U.S. PATENT DOCUMENTS

| | | | |
|---|---|---|---|
| 395,684 | 1/1889 | Baker | 164/427 |
| 2,055,980 | 9/1936 | Liebmann | 164/419 |
| 2,073,465 | 3/1937 | Deitz, Jr. | 72/263 |
| 2,123,894 | 7/1978 | Hazelett | 164/454 |
| 2,709,842 | 6/1955 | Findlay | 164/270 |
| 2,710,433 | 6/1955 | Properzi | 164/433 |
| 2,865,067 | 12/1958 | Properzi | 164/433 |
| 2,928,148 | 7/1960 | Porterfield | 164/433 |
| 3,284,859 | 11/1966 | Conlon et al. | 164/259 |
| 3,318,369 | 9/1970 | Bray et al. | 164/433 |
| 3,528,479 | 9/1970 | Cole et al. | 164/449 |
| 3,575,231 | 4/1971 | Lenaeus | 164/427 |

FOREIGN PATENT DOCUMENTS

| | | |
|---|---|---|
| 21260 | 3/1883 | Fed. Rep. of Germany . |
| 42-6961 | 3/1967 | Japan .................. 164/429 |
| 181338 | 8/1923 | United Kingdom . |
| 465122 | 4/1937 | United Kingdom ........... 164/429 |
| 668338 | 3/1952 | United Kingdom ........... 164/427 |
| 712690 | 7/1954 | United Kingdom . |
| 759290 | 10/1956 | United Kingdom . |

OTHER PUBLICATIONS

Cartwright, J. S., "Development of a Disc Extruder for Continuous Hydrostatic Extrusion", High-Pressure Science and Technology, 1979, pp. 729–735.

*Primary Examiner*—Gus T. Hampilos
*Attorney, Agent, or Firm*—A. S. Rosen; R. F. Kip, Jr.; D. J. Kirk

[57] ABSTRACT

Molten material is fed into an elongated outwardly open mold, moving in a predetermined path, and is thereafter conveyed by the mold movement at least partway through a region of such path over which a closure for the outward opening of the mold moves along therewith, the material concurrently being cooled to become solidified. The movements of such mold and closure cause the solidified material to be extruded through stationary die means disposed in such region. Such material may solder metal formed into a tube into which is inserted rosin, the same heat exchange medium being used both to cool the metal prior to its extrusion and to keep the rosin molten prior to such insertion thereof.

13 Claims, 8 Drawing Figures

METHODS AND APPARATUS FOR CASTING AND EXTRUDING MATERIAL

CROSS-REFERENCE TO RELATED APPLICATIONS

This application is a continuation-in-part of my copending U.S. patent application, Ser. No. 810,457 filed June 27, 1977, entitled "Continuous Casting Methods and Apparatus" now abandoned.

TECHNICAL FIELD

This application discloses methods and apparatus for casting and extruding material, the extrusion aspects thereof having features in common with methods and apparatus disclosed in (a) my U.S. application, Ser. No. 664,611 filed Mar. 8, 1976 and entitled "Methods for Continuous Extrusion" (now U.S. Pat. No. 4,094,178, issued June 13, 1978) and (b) my U.S. patent application Ser. No. 890,875 filed Mar. 27, 1978 as a division of said application Ser. No. 664,611 and entitled "Apparatus for Continuous Extrusion" (not U.S. Pat. No. 4,212,177 issued July 15, 1980), both of which are assigned to the assignee of this application, and the disclosure of each of which is incorporated herein by reference.

BACKGROUND OF THE INVENTION

The invention relates to methods and apparatus for casting and extruding a material, such as a metal, and, more particularly, to methods and apparatus for casting and extruding a material, such as a metal, in which movement involved in the casting of the material is utilized to also effect its extrusion.

Japanese Pat. No. 42-6961, published Mar. 22, 1967 discloses casting apparatus which allegedly operates as follows. Molten metal is introduced into an annular mold supported on the periphery of a disk. Such metal is then transported by rotation of the disk, through a region of overlap of the mold and a rotating lid, to be cooled within such region to the extent where the metal is said to be solidified at least on the surface. When the metal emerges from such region, it is further transported by rotation of the disk to move through another region (within which it is said to be air-cooled) before being removed from the mold in the form of metal rod.

U.S. Pat. No. 2,709,842 issued June 7, 1955 in the name of Findlay discloses apparatus for the production of ingots of high-melting-point metals such as zirconium and titanium. The patent teaches that such apparatus operates in the following manner. An electrode above an ingot in a liquid-cooled stationary cold mold converts stock material fed to the top of the ingot into molten metal lying on such top. Concurrently, a set of withdrawing rolls engages the bottom of the ingot to exert thereon a downward force causing the ingot to be slowly withdrawn down through the stationary mold and then through a cooling chamber (within which the ingot is cooled by surrounding argon) and then through a reducing die which also acts an an air-tight seal permitting the ingot to be progressively formed and cooled in an air-free environment. A control system measures the force required to draw the ingot down through the mold and, also, responds to the amount of such force to adjust the power fed to the electrode and, thereby, the plasticity of the forming ingot so as to tend to keep such force constant.

British Pat. No. 465,122 issued in the name of F. J. Kahlhaas (Complete Specification accepted Apr. 30, 1937) discloses apparatus which is alleged to operate as follows. Metal is cast into annular grooves formed in the upper surface of a rotary casting table to be transported by the table's rotation through approximately one-third of a revolution thereof to a point at which the metal is removed from those grooves. While being so transported, the cast metal is cooled. For part of its travel between the points at which it is cast and removed, the metal is covered by an endless chain of cover plates which overlie the mentioned grooves and may be positively driven through gearing to undergo movement synchronous with that of the table. After the metal is removed from the table, it may be led through forming rolls, the rotation of the table being utilized to thrust the metal through such rolls.

U.S. Pat. No. 3,765,216 issued Oct. 16, 1973 in the name of Derek Green, teaches extrusion apparatus of various kinds in which a rotating wheel has in it a circumferential groove covered over part of its arcuate extent by a stationary shoe forming with such groove an enclosed passageway. Located at the exit end of such passageway are (a) an abutment member which closes it and (b) one or or more die orifices. Metal introduced into such passageway is caused by the rotation of such wheel to be extruded through the orifice(s).

None of the four patents just discussed discloses methods and apparatus wherein material is both cast and extruded, and wherein movement involved in the casting of such material is utilized also to effect extrusion of the material.

SUMMARY OF THE INVENTION

The invention contemplates methods and apparatus for casting and extruding metal comprising: metal transport means having an elongated outwardly open cavity defined in a surface thereof, a portion of said open cavity defining an outwardly open mold cavity, said metal transport means being movable in a predetermined path; means associated with said metal transport means and said mold cavity for feeding molten metal into said mold cavity at a site along said outwardly open cavity; movable enclosing means disposed adjacent said metal transport means and cooperating with said metal transport means to function as a movable closure for a region of said outwardly open cavity including the site, the mold cavity and a portion of the open cavity extending downstream of the site and mold cavity defining an extruder feed chamber for receiving metal exiting from said mold cavity; a stationary die at least partially mounted in said outwardly open cavity and having a stem portion extending rearwardly therefrom and into said extruder feed chamber; drive means coupled to said metal transport means for moving said mold cavity along said path to convey metal in said mold cavity to said extruder feed chamber and then into said die; and cooling means associated with said metal transport means and said mold cavity for fully solidifying the molten metal within said cavity; said drive means being further coupled to said closure means for effecting, within said region, movement of the closure means with said metal transport means; said drive means, metal transport means and movable closure cooperating to produce pressure in said extruder feed chamber causing extrusion of said solidified metal through said stationary die.

DETAILED DESCRIPTION

Figure 1:
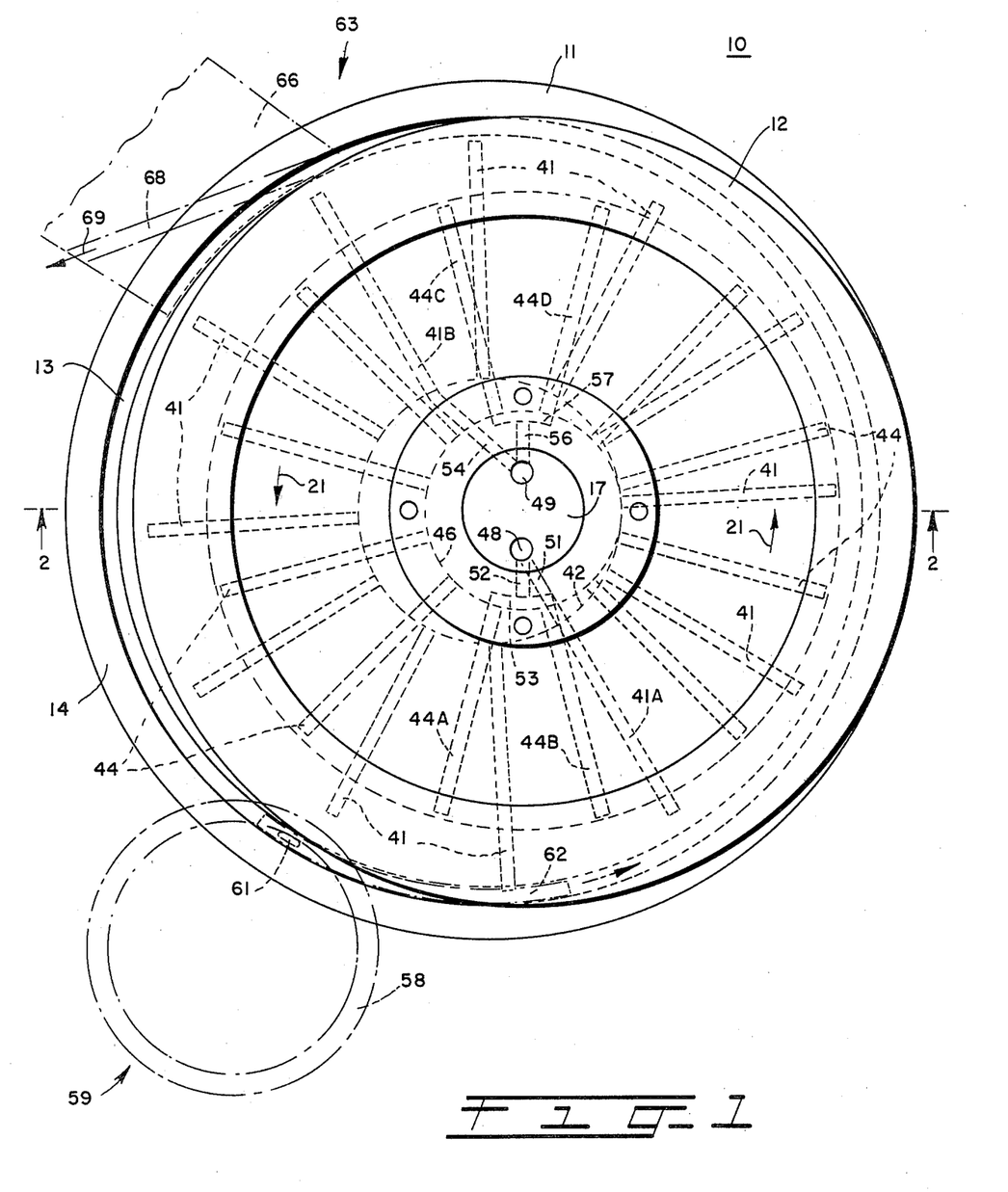
FIG. 1 of the drawing is a plan view of a first embodiment of a continuous casting apparatus, constructed in accordance with the principles of the invention, such first embodiment including a pair of rotary members which define between them a cooling region, a mechanism for feeding a molten material into an annular groove in a radially extending surface of a lower one of the two rotary members, and a mechanism for discharging the material from the annular groove in solidified condition after rotation of the two rotary members has transported the material through the cooling region.
Figure 2:
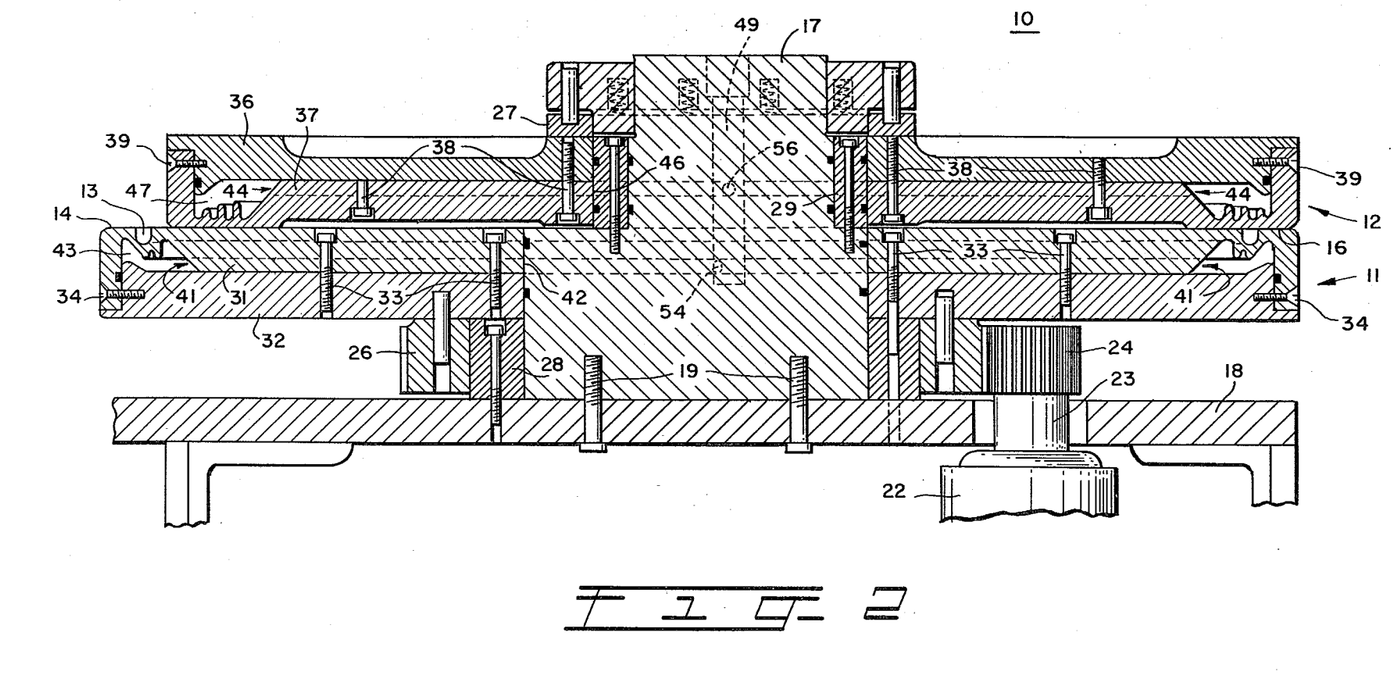
FIG. 2 is an enlarged, vertical, sectional view of the apparatus shown in FIG. 1, taken along the line 2—2 in FIG. 1, illustrating additional aspects of such apparatus, including a mechanism for rotating the two rotary members, and portions of a fluid circulation system for cooling the two rotary members internally.

Referring initially to FIGS. 1 and 2 of the drawing, a first embodiment 10 of a continuous casting apparatus is shown. The apparatus 10 includes two principal members 11 and 12. Material transport means in the form of a rotary first member 11, which is a lower one of the two members 11 and 12, includes an elongated outwardly open mold in the form of annular groove 13 in a radially extending, upper, first surface 14. A movable rotary, second member 12 covers, and thereby encloses, a portion of the annular groove 13 in the first member 11, due to the engagement of a radially extending, lower, second surface 16 (FIG. 2) of the second member 12 with a portion of the radially extending, upper, first surface 14 of the first member 11. The enclosed portion of the annular groove 13 constitutes a cooling region, in which a molten material is to be solidified.

The first and second members 11 and 12 have circular outer peripheries, with the diameter of the first member 11 being greater than that of the second member 12. The two members 11 and 12 are mounted for rotation about a fixed, central hub 17, with a substantially vertical axis of the second member 12 offset somewhat from a substantially vertical axis of the first member 11 in order that the second member may cover or enclose only the cooling region portion of the annular groove 13, while leaving another portion of the annular groove 13 unenclosed. The hub 17 is fixed to a base 18 by conventional means, such as bolts 19,19.

By virtue of member 11 being rotatable about its axis, the groove shaped mold 13 in such member is movable in a predetermined path closed upon itself and in the specific form, of a circle having such axis as its center. Moreover, by virtue of member 12 being rotatable about the axis respective thereto, the annular part of member 12 of which a changeable portion overlaps with mold 13 is movable in a predetermined path closed upon itself and in the specific form of another circle having the latter axis as its center. Such annular part accordingly constitutes movable enclosing means of which such changeable portion thereof provides a movable closure for the outward opening of mold 13 over that region of the path of mold movement within which such portion fully covers and encloses such outward opening.

A suitable drive means for rotating the first member 11 about the hub 17, e.g., in the direction of arrows 21,21, (FIG. 1) is provided by a fluid or other motor 22 (FIG. 2) with a shaft 23. Such drive means is coupled to the members 11 and 12 as follows. The shaft 23 projects through the housing 18 to drive pinion 24 which is enmeshed with an annular gear 26 affixed to the first member 11. The second member 12 is adapted to rotate about the hub 17, simultaneously with the rotation of the first member 11, along an offset axis as indicated previously, due to frictional engagement between the members 11 and 12. Such frictional engagement is enhanced by force-biasing means including a spring-biased, pressing ring 27 coupled to member 12 by direct contact therewith and coupled to member 12 by a force transmitting path including the compressive springs for such ring, the annular flange on top of hub 17 in which such springs are received, and the hub 17 itself. Suitable bearings 28 and 29 are provided, respectively, between the hub 17 and the annular gear 26, and between the hub 17 and the second member 12, in order to permit the described rotation of the two members 11 and 12 about the hub 17.

The first member 11 is composed of two halves 31 and 32, which are joined together by conventional means, such as bolts 33,33 and screws 34,34. Similarly, the second member 12 is composed of two halves 36 and 37, which are joined together by conventional means, such as bolts 38,38 and screws 39,39. A first set of radially extending, internal passageways 41,41, (FIG. 1), separated from one another by 30° angles, joins a radially innermost surface 42 of the first member 11, adjacent to the hub 17, with a first annular chamber 43 (FIG. 2) which is located within the first member 11 between the two halves 31 and 32, beneath the annular groove 13. Similarly, a second set of radially extending, internal passageways 44,44 (FIG. 1), separated from one another by 30° angles, joins a radially innermost surface 46 of the second member 12, adjacent to the bearing 29, with a second annular chamber 47 (FIG. 2) which is located within the second member 12 between the two halves 36 and 37, along a radially outermost portion of the interior of the second member 12.

A cooling fluid inlet passageway 48 (FIG. 1) and a cooling fluid discharge passageway 49 extend generally axially through an upper portion of the hub 17. The cooling fluid inlet passageway 48 is coupled via a first connecting passageway 51 through the hub 17 to supply a cooling fluid to the radially innermost surface 42 of the first member 11, and via a second connecting passageway 52 through the hub 17 to supply the cooling fluid to a small, first arcuate distribution chamber 53 within the bearing 29 along the radially innermost surface 46 of the second member 12. Similarly, the cooling fluid discharge passageway 49 is coupled via a third connecting passageway 54 through the hub 17, located approximately 180° about the periphery of the hub 17 from the first connecting passageway 51, to receive the cooling fluid from the radially innermost surface 42 of the first member 11, and via a fourth connecting passageway 56 through the hub 17, located approximately 180° about the periphery of the hub 17 from the second connecting passageway 52, to receive the cooling fluid from a small, second arcuate distribution chamber 57 within the bearing 29 along the radially innermost surface 46 of the second member 12.

The arrangement is such that a cooling fluid may be circulated through the interior of both the first member 11 and the second member 12 upon the simultaneous rotation of the two members 11 and 12. In particular, circulation within the first member 11 will take place via the cooling fluid inlet passageway 48; the first connecting passageway 51; each successive radially extending passageway 41 as it moves past the first connecting passageway 51, e.g., the radially extending passageway 41A in FIG. 1; the first annular chamber 43; each successive radially extending passageway 41 as it moves past the third connecting passageway 54, e.g., the radially extending passageway 41B in FIG. 1; the third connecting passageway 54; and the cooling fluid discharge passageway 49. The circulation of the cooling fluid through the interior of the second member 12 will occur via the cooling fluid inlet passageway 48; the second connecting passageway 52; the first arcuate distribution chamber 53; each successive radially extending passageway 44 as it moves past the first arcuate distribution chamber 53, e.g., the radially extending passageways 44A and 44B in FIG. 1; the second annular chamber 47; each successive radially extending passageway 44 as it moves past the second arcuate distribution chamber 57, e.g., the radially extending passageways 44C and 44D in FIG. 1; the second arcuate distrubution chamber 57; the fourth connecting passageway 56; and the cooling fluid discharge passageway 49. The cooling fluid inlet and discharge passageways 48 and 49 are, of course, connected, respectively, to a conventional source of a cooling fluid under pressure, such as a pump, and a conventional receptacle for the cooling fluid, such as a sump (neither of which is shown in relation to this first embodiment of the invention, but each of which may be of the respective type illustrated schematically in FIG. 5 of the drawing for a third embodiment of the invention hereinafter to be described).

A tundish 58 (FIG. 1) is positioned above the first member 11 at a feeding station 59 occupying a site along the mentioned path of movement of the mold 13. The tundish 58 is of a conventional type, and includes a bottom opening 61 and a curved tube 62 for feeding a molten material, e.g., a molten metal such as copper, aluminum or solder, into the annular groove 13 in the radially extending, upper surface 14 of the first member 11. The feeding station 59 is so located that the molten material will be fed into the annular groove 13 in the vicinity of the entry of the annular groove 13 into the cooling region beneath the second member 12, as the two members 11 and 12 rotate in the direction of arrows 21,21. The end of tube 62 is the site along the path of movement of mold 13 at which the material in molten form is fed or cast into the mold.

A discharging station 63 (FIG. 1) is located along the first member 11, in the vicinity of the position at which the annular groove 13 emerges from the cooling region beneath the second member 12. Mounted at the discharging station 63 are a scraper 64 (FIG. 3) and a support 66 (FIG. 1) for the scraper 64. The scraper 64 constitutes a curved blade, extending into the annular groove 13 in the first member 11 and back into the cooling region. A ramp provided by an upper surface 67 of the scraper 64 is so disposed as to scrape and discharge solidified material 68 from the annular groove 13 as the solidified material 68 is transported from the cooling region due to further rotation of the first member 11.

The operation of the apparatus 10 of FIGS. 1-3 of the drawing will next be described. In an initial condition of the apparatus 10, the motor 22 (FIG. 2) is operating to drive the first member 11 in the direction of arrows 21,21 (FIG. 1) through the shaft 23 (FIG. 2) the pinion 24 and the annular gear 26. Frictional engagement between the two members 11 and 12, under the urging of the pressing ring 27, causes the second member 12 also to rotate in the direction of arrows 21,21. An adequate supply of a molten material is currently present in, and may be continually introduced in conventional manner into, the tundish 58 (FIG. 1) at the feeding station 59. A pressurized cooling fluid is circulating through the interiors of the two members 11 and 12 along the previously described circulation paths.

The molten material is now caused, in conventional manner, to flow through the opening 61 and the curved tube 62 so as to enter into the annular groove 13 in the radially extending, upper surface 14 of the first member 11. The molten material is transported within the annular groove 13 through the cooling region beneath the lower surface 16 (FIG. 2) of the second member 12 due to the rotation of the first member 11.

As the pressurized cooling fluid flows through the annular chambers 43 and 47 (FIG. 2) in the respective members 11 and 12, the fluid continuously receives heat from the cooling region, thereby cooling, and causing solidification of, the advancing molten material within the annular groove 13. Each of the two internally cooled members 11 and 12 contributes substantially to such cooling of the molten metal.

Continuing rotation of the first member 11, with the simultaneous rotation of the second member 12, next transports the solidified material 68 (FIG. 1) into the discharging station 63. The ramp provided by the upper surface 67 (FIG. 3) of the scraper 64, which extends into the annular groove 13 in the first member 11, is engaged by the solidified material 68. Thus, the solidified material 68 is scraped and discharged from the annular groove 13 in a continuous manner, and advances continuously, tangentially to the annular groove 13, in the direction of arrow 69, toward conventional take-up or collection facilities (not shown).

Figures 3, 4:
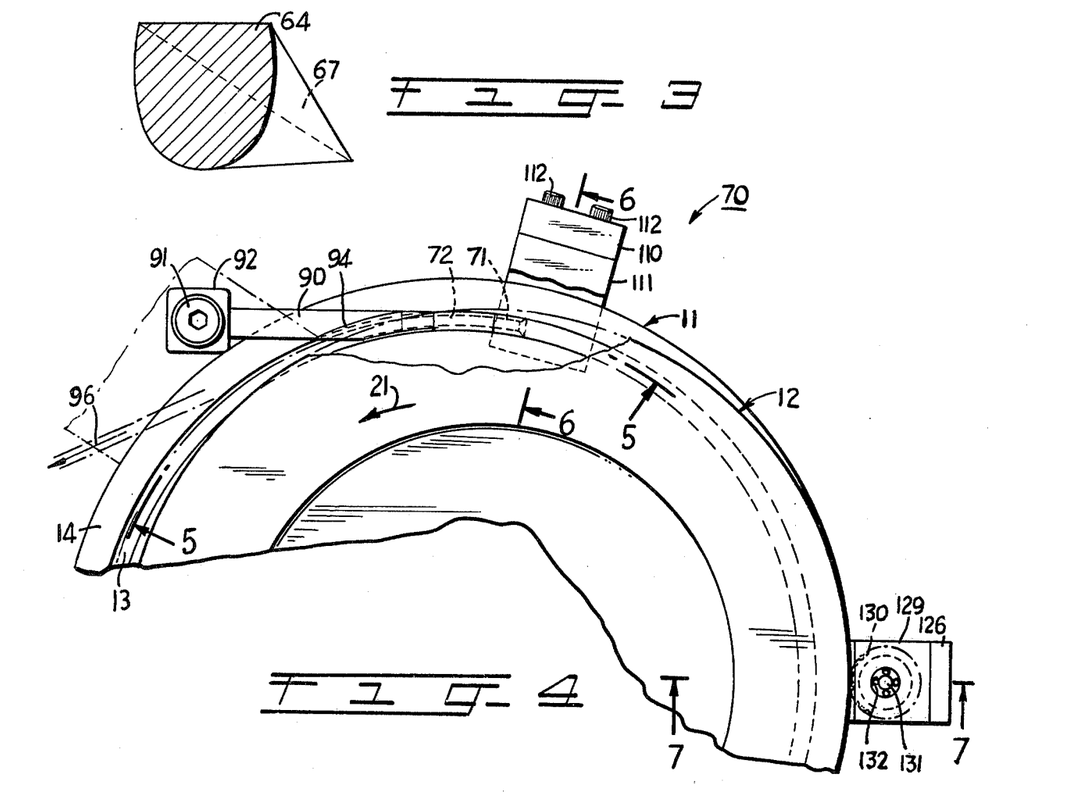
FIG. 3 is an enlarged, vertical sectional view of a scraper mechanism for discharging the solidified material from the annular groove in the lower rotary member, such view being taken along a plane perpendicular to the annular groove looking counter to the direction of rotation of the lower rotary member.
FIG. 4 is a plan view of a portion of the apparatus shown in FIG. 1, so modified as to constitute a second embodiment of the invention, wherein an extrusion die extends into the annular groove in the lower rotary member in order to produce an elongated product of a desired cross-sectional configuration, which configuration is provided by the presence of an aperture of corresponding shape extending through the die.

Referring next to FIG. 4 of the drawing, a portion of a second embodiment 70 of the continuous casting apparatus is illustrated. The second embodiment 70 is substantially similar to the first embodiment 10, but differs from the first embodiment 10 in that the second embodiment 70 is effective to form an elongated product 68', having a desired cross-sectional configuration, from the molten material initially fed from the tundish 58 (FIG. 1) into the annular groove 13 in the radially extending, upper surface 14 of the first member 11.

The second embodiment 70 (FIG. 4) includes an extrusion die 71 located in the vicinity of the discharging station 63, extending somewhat into the enclosed, cooling region of the annular groove 13. More particularly, the front of the die is disposed in mold 13 within the region of full overlap between the outward opening of such mold and member 12, and such die front is received with a close sliding fit within the enclosure provided by such mold and member 12. The stem of the die extends rearwardly from such region. The die 71 has an aperture 72 extending longitudinally through its body. The shape of the die aperture 72 corresponds to the desired cross-sectional configuration of the elongated product 68'.

Figure 5:
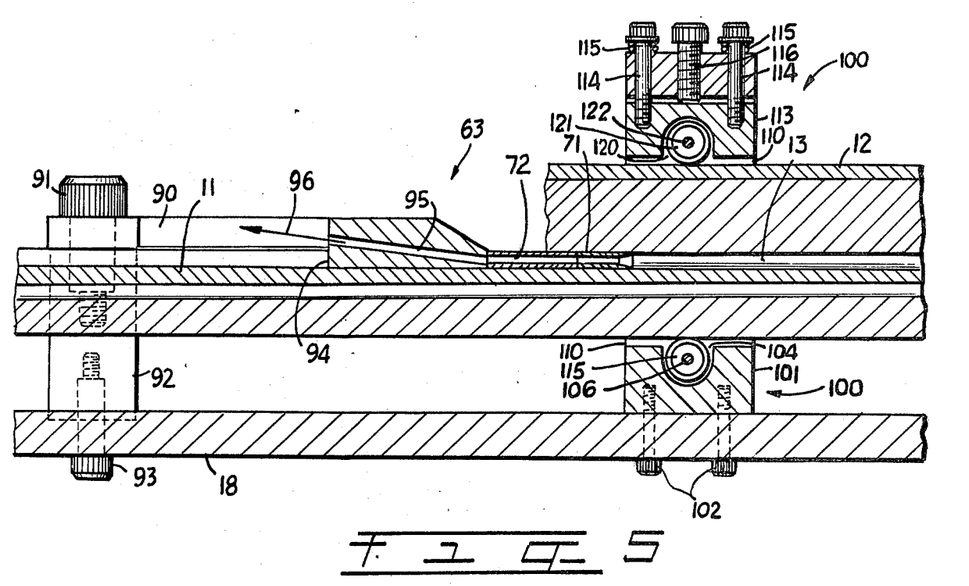
FIG. 5 is an enlarged vertical sectional view of part of the FIG. 4 apparatus, the sectioning for such view being curved as indicated by the curved cross-sectioning line and arrows 5—5 in FIG. 4, but such view having been developed in arriving at the showing thereof in FIG. 5.

Referring to FIGS. 4 and 5, die 71 is held stationary in mold 13 in a manner as follows. A die stem support arm 90 is coupled at its rear end by a screw 91 to the top of a vertical post 92 of which the bottom is coupled by a screw 93 to base 18. The rear of arm 90 extends over and clears the upper surface of member 12. The front of arm 90 is shaped on its inner side to register with clearance (FIG. 4) with the outside of rotary member 12, and such front further has thereon a downward projection 94 shaped to be received with a sliding fit in mold 13 at a position which, in the direction of rotation of members 11 and 12, is beyond the region at which member 12 fully overlaps with and closes the mold 13. Die 71 is coupled at the rear of its stem by welding or the like to the front of projection 94, and the aperture 72 of the die communicates at its rear with a passageway 95 formed in the front of arm 90 to slant away from the die both upwardly and inwardly away from the centerline of the arm. Such passageway leads from the die through arm 90 to an opening (not shown) on the inner side thereof from which extrudate from the die is discharged as indicated by the arrow 96.

Figure 6:
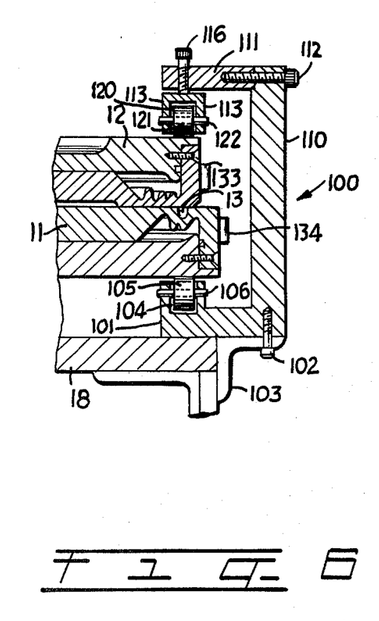
FIG. 6 is an enlarged vertical sectional view, taken as indicated by the arrows 6—6 in FIG. 4, of another part of the FIG. 4 apparatus.

FIGS. 5 and 6 show details of a force biasing means 100 usable as a supplement or alternative to the force-biasing means comprising pressing ring 27. In the unit 100, a housing block 101 is fastened via screws 102 and a bracket 103 to base 18. Formed in the top of block 101 is a central recess 104 within which is received a roller 105 mounted on a shaft 106 of which opposite ends are mounted in bearings received in parts of block 101 which provide side walls for recess 104. The top of roller 105 makes with the underside of member 11 a rolling contact which, in the direction of rotation of that member (FIG. 4), precedes the front end of die 71 and is disposed within the region of the path of movement of mold 13 over which the outward opening of such mold is fully closed by member 12.

Block 101 forms part of a U-shaped yoke of which the other parts comprise a vertical plate section 110 extending upward from 101 and a horizontal plate 111 fastened by screws 112 to section 110 and projecting outwards from that section to overlie member 12. Plate 111 supports below it a housing block 113 similar to block 101 and fastened to plate 111 by vertical screws 114 received in threaded holes in block 113 but passing through unthreaded holes in plate 111 to permit adjustment in the vertical spacing between that plate and the block. Compression springs 115 encircling screws 114 between the heads thereof and the top of plate 111 urge those screws and the attached block 113 upwardly. A vertical thrust down screw 116 passing through a central threaded hole in plate 111 contacts the top of block 113 and is adapted by rotation to move such block down against such upward urging. The vertical position of screw 116 relative to plate 111 determines the spacing from that plate of block 113.

Block 113 has formed therein a central recess 120 within which a roller 121 is mounted on a horizontal shaft 122 having opposite ends mounted in bearings received in parts of such block forming side walls for such recess. The bottom of roller 121 makes with the upper side of member 12 a rolling contact which is vertically opposite the contact made by lower roller 105 with the underside of member 11. The force biasing unit 100 is thus coupled with members 11 and 12 to preload the latter by compressive force which is adjustable in amount by adjustment of thrust-down screw, 116 and which is exerted, within the region at which member 12 provides a full closure of the outward opening of mold 13, to urge such closure towards such mold. In such respect, the unit 100 acts in the same manner as does the force-biasing means comprising pressing ring 27 except that the effect of unit 100 is more localized.

Figure 7:
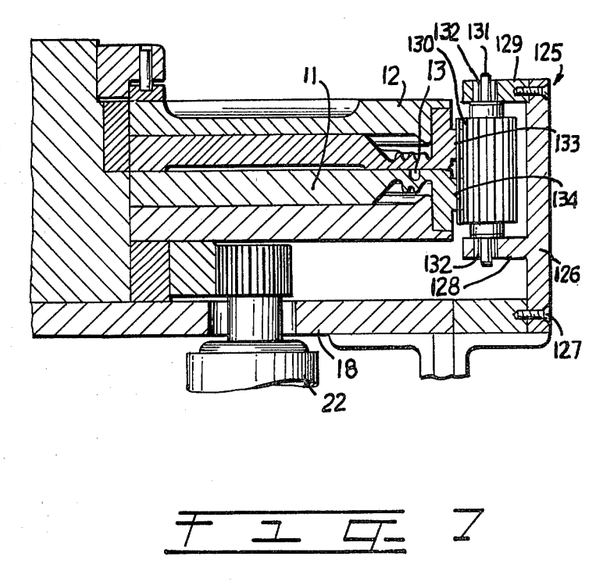
FIG. 7 is an enlarged vertical sectional view, taken as indicated by the arrows 7—7 in FIG. 4, of still another part of the FIG. 4 apparatus.

FIG. 7 shows details of a gear unit 125 usable as a supplement or alternative to the drive of member 12 by member 11 by frictional engagement therebetween. The unit comprises a vertical plate section 126 fastened at its lower end by screws 127 to base 18 and disposed outwards of members 11 and 12 at the angular position around the periphery of member 11 which is on the line joining the respective axes of rotation of those two members. Projecting inwards from vertical plate section 126 are lower and upper horizontal plate sections 128 and 129 vertically spaced from each other. Received within that vertical spacing is a cylindrical pinion gear 130 mounted on a vertical shaft 131 of which the opposite ends are inserted in bearings 132 received in respective holes in the plates 128,129. Pinion gear 130 meshes with both an annular rack gear 133 on the periphery of member 12 and an annular rack gear 134 on the periphery of member 11. When motor 22 drives member 11 as heretofore disclosed, the resulting rotation of such member and the gear 134 thereon drives pinion gear 130 which in turn, through rack gear 133, drives member 12 in rotation so as to have the same peripheral speed as member 11 at the mentioned angular position of gear unit 125. Such angular position is at the center of the region of the path of movement of mold 13 over which the outward opening of such mold is fully enclosed by the movable closure provided therefor by member 12. Accordingly, gear unit 125 provides respective movements of such mold and closure, along such path over such region, which are not only concurrent but also synchronized to be the same at such position and as close to the same as possible to either side of such position.

The operation of the second embodiment 70 is identical to that of the first embodiment 10 up to the solidification of the material 68 within the annular groove 13 in the cooling region beneath the lower surface 16 of the second member 12. The solidified material 68 then encounters the die aperture 72. Continuing rotation of the two members 11 and 12 thereupon causes the solidified material 68 to be extruded through the die aperture 72, and to be discharged in continuous manner from the annular groove 13 as the elongated product 68' of desired cross-sectional configuration.

There is now described more specifically the operation of the FIG. 4 apparatus for purposes of casting and extruding a metal (whether or not an alloy) as, for example, solder metal. As such metal in mold 13 is conveyed thereby to extrusion die 71, the rate of cooling of the metal and the mold movement speed are mutually adjusted to lower the temperature of the metal as it reaches the mold to a value which is preferably below that at which the metal would remelt upon being extruded and thereby result in an output which would be coarse grained and brittle. On the other hand, the temperature of such metal before and when it reaches die 71 is preferably (but not necessarily) never below the crystallization temperature of the metal in order to lower by a factor of possibly several times the pressure needed to extrude the material through die 71 as compared to the pressure required for such result if such metal were to be at room temperature. It is also desirable (but not necessary) to render the temperature of the metal, as it reaches the die, nearer to such recrystallization temperature than to such remelting temperature. That is so because the closer such attained temperature of the metal is to its recrystallization temperature while still being above it, the more ductile and fine grained will be the output from die 71.

In the operation of the FIG. 4 apparatus, the metal is fed into mold 13 to fully fill it to the top. Accordingly, such mold and the closure provided by member 18 for the mold's outward opening form, in effect, ahead of die 71, an extrusion chamber closed at one end by stationary die 71. Such chamber is of arcuate shape and circumferentially completely encloses the metal in the mold by walls moving continuously towards the die. Since such metal fills that chamber, both the movement of the mold and the movement of the mentioned closure act through frictional contact with the metal to create therein in such chamber a pressure causing the metal to be extruded through die 71 and passageway 95, and to emerge from the FIG. 4 apparatus in the form of an output of elongated product of indefinite length and desired cross-sectional configuration. The generation of such pressure is aided by the arcuate shape of the extrusion chamber in that, at the interface between the body of metal in the chamber and the moving walls thereof, the force generated by such walls acts not only parallel to such interface but, also, because of such shape, has a component directed inwards of such interface and acting, in effect, against the cross-section of that body so as to urge it in the direction towards the die.

The pressure so generated reacts against the described movable closure to tend to lift it away from mold 13 and open up the extrusion chamber. Such tendency is, however, overcome by the preloading force exerted by the force biasing means comprising pressing ring 27, or unit 100 (thrust down screw 116 thereof having been appropriately adjusted to create the requisite amount of force), or both of such means. While the use of both ring 27 and unit 100 to provide the requisite preloading force is preferred, either such means can be used for that purpose.

In order for the pressure in the extrusion chamber not to become excessive, it is desirable that the cross-sectional area of aperture 72 of die 71 be no less than 50% of the cross-sectional area of the metal in the chamber. That is, the reduction in the cross-sectional area of the metal effected by its extrusion through die 71 is, expressed as a ratio, preferably no more than 2:1.

The output resulting from the described operation of the FIG. 4 apparatus is an elongated metal product which is of desired cross-sectional configuration and, also, is ductile and fine grained. By virtue of having been rendered ductile by being extruded under the conditions described, an indefinite length of the product, can be directly and continuously fed to another facility. Also, such ductile product can, if desired, be drawn without breaking. In contrast, if the metal in mold 13 were to be removed therefrom without benefit of being extruded therefrom as described, the resulting product would be coarse grained and brittle with a tendency to break into pieces so as to be relatively unsuitable for drawing or for continuous feeding to another facility. Such would be particularly true in the case of two-phase alloys such as solder alloys having a high tin content.

Other advantages provided by the FIG. 4 apparatus in connection with casting and extruding metal are that, when the performance of both operations on the same metal is desired, such apparatus realizes such performance in an efficient and economical manner in that a common structure and common motive power is utilized to achieve both the casting and the extruding of such metal and, as an energy saving measure, the metal may be extruded while above its recrystallization temperature to thereby lower the pressure required for the extrusion without the necessity of reheating the metal in order to realize extrusion thereof at such lowered pressure.

Figure 8:
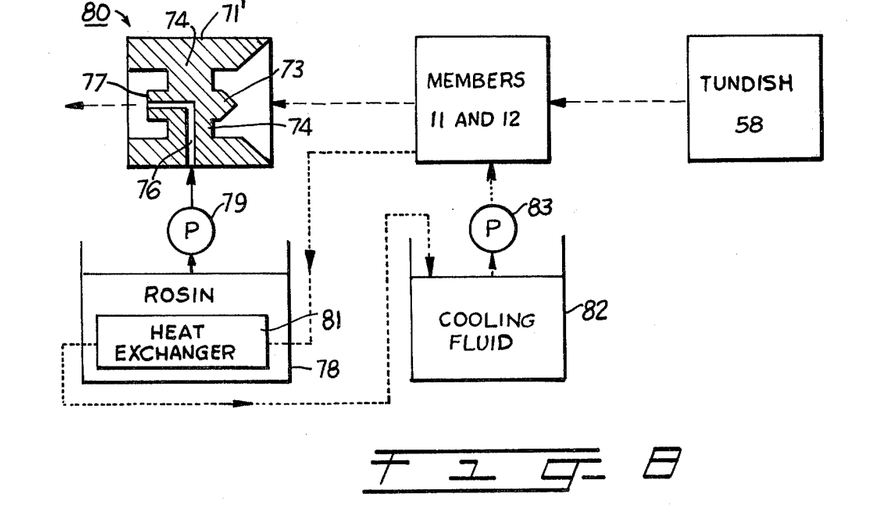
FIG. 8 is a schematic illustration of a third embodiment of the invention wherein the second embodiment is so modified as to produce a rosin-cored solder product.

Turning now to FIG. 8 of the drawing, a third embodiment 80 of the continuous casting apparatus is illustrated schematically. The third embodiment is substantially similar to the second embodiment 70, but differs from the second embodiment 70 in that the third embodiment 80 is effective to produce an elongated product 68' of a particular type, namely, a rosin-cored solder.

The third embodiment 80 substitutes for the extrusion die 71 of the second embodiment 70, an extrusion die 71' which includes a mandrel 73, supported by one or more webs 74,74. A passageway 76, which extends through one of the webs 74,74 to a downstream end 77 of the mandrel 73, is adapted to conduct molten rosin from a first reservoir 78 to the mandrel end 77. A pump 79 is utilized for feeding the rosin to the passageway 76 from the first reservoir 78 following the path indicated by the solid lines and arrows in FIG. 8. In order that feeding of the rosin may take place smoothly and continuously from the first reservoir 78, through the pump 79 and then through the passageway 76, the rosin must be maintained in molten condition, at an elevated temperature, e.g., 175° F.

A heat exchanger 81 is located in the rosin reservoir 78. A cooling fluid is maintained in a second reservoir or sump 82 and is circulated through the interiors of the members 11 and 12 by a pump 83 in similar manner to the circulation of cooling fluid discussed previously with respect to the embodiments 10 and 70. Such cooling fluid, of course, receives heat from the members 11 and 12 while cooling such members. The cooling fluid, and the design of the cooling system, are preferably so interrelated that the cooling fluid, e.g., water, exits from the members 11 and 12 at a temperature, e.g., 200° F., somewhat in excess of that required to keep the rosin molten. The heated cooling fluid is conducted to the heat exchanger 81 from the members 11 and 12, and serves to give up sufficient heat within the heat exchanger 81 to maintain the rosin at its required temperature. Thus, the rosin is advantageously heated as the cooling fluid is advantageously cooled, prior to the recirculation of the cooling fluid through the second reservoir or sump 82 and the pump 83 to the two members 11 and 12. The path taken by the cooling fluid is indicated by the dotted lines and arrows in FIG. 8.

The operation of the third embodiment 80 is identical to that of the second embodiment 70 up to the entry of the material 68 into the region of the die 71'. Such material 68 is solder in the case of the third embodiment 80. The solder material, which follows the dash line and arrow path in the schematic illustration provided by FIG. 8, has been fed in molten form from the tundish 58 into the annular groove 13 in the first member 11, has been transported through substantially the entirety of the cooling region beneath the second member 12, and is now reaching the die 71' of the third embodiment 80 as solidified solder 68. As the solidified solder 68 encounters the mandrel 73, it is deformed into tubular shape, and is then filled with molten rosin issuing from the passageway 76 at the downstream end 77 of the mandrel 73. As this desired rosin-cored solder product is being formed, in continuous manner, the cooling fluid is continuously being circulated through the interiors of the two members 11 and 12, with the molten solder in the cooling region of the annular groove 13 giving up heat to the cooling fluid. The heated cooling fluid is continuously being circulated through the heat exchanger 18, giving up heat to the rosin in the reservoir 78 in order to maintain the rosin molten and, thus, in flowable condition.

It is to be understood that the described embodiments are simply illustrative of the apparatus and methods of the invention. Many modifications may, of course, be made in accordance with the principles of the invention.

What is claimed is:

1. A method of continuously casting and extruding a material, comprising the steps of:
   (a) at a feeding station, introducing the material in molten condition into an annular groove in a radially extending, first surface on a first rotary member;
   (b) enclosing a portion of the annular groove in the first surface with a radially extending second surface on a second rotary member, so as to define a region of overlap between the second rotary member and the annular groove;
   (c) rotating the first and second rotary members simultaneously about two different axes in such direction as to transport the molten material within said annular groove from the feeding station and partly through said region of overlap while simultaneously cooling said material to produce full solidification thereof in the course of such transportation thereof; and
   (d) further utilizing the rotation of said first and second members to cause extrusion of the material from the annular groove, in solidified condition, through an extrusion die disposed in said groove with at least part thereof being within said region of overlap, said die having an aperture shaped in conformity with a desired cross-sectional configuration, thereby to form an elongated product of said desired cross-sectional configuration from said material.

2. A method as set forth in claim 1, said elongated product being rosin-cored solder, said molten material being molten solder, and said die aperture being so configured as to form an elongated tube of solidified solder, the method further comprising:
   (e) applying a cooling medium internally to at least one of said first and second rotary members so as to remove heat from said region of overlap while heating the cooling medium;
   (f) applying said heated cooling medium to a rosin material so as to remove heat from the cooling medium while maintaining the rosin material in a molten condition; and
   (g) introducing said molten rosin material into the interior of said tube of solidified solder in the vicinity of said die.

3. A method of casting and extruding metal comprising: moving a metal transport means having an elongated outwardly open cavity defined in a surface thereof, a portion of said open cavity defining an outwardly open mold cavity, in a predetermined path; feeding molten metal into said mold cavity at a site along said outwardly open cavity with means associated with said metal transport means and said mold cavity; movably enclosing a region of said outwardly open cavity including the site with means disposed adjacent said metal transport means and cooperating with said metal transport means to function as a movable closure, the mold cavity and a portion of the open cavity extending downstream of the site and mold cavity defining an extruder feed chamber for receiving metal exiting from said mold cavity extending rearwardly therefrom and into said extruder feed chamber; moving said mold cavity along said path with drive means coupled to said metal transport means to convey metal in said mold cavity to said extruder feed chamber and then into a stationary die means at least partially mounted in said outwardly open cavity and having a stem portion extending rearwardly therefrom into said extruder feed chamber; fully solidifying the molten metal within said cavity with cooling means associated with said metal transport means and said mold cavity; further coupling said drive means to said closure means for effecting, within said region, movement of the closure means with said metal transport means; extruding said solidified metal through said stationary die by the cooperative movement of said drive means, metal transport means and movable closure which produces sufficient pressure to force the metal through said stationary die.

4. A method as in claim 3 in which the cooling of said conveyed metal is regulated to lower its temperature in the course of its conveyance to said die means to a value which is less than at which remelting of such metal will occur upon its extrusion through said die means, but which at no time is less than the recrystallization temperature of said metal.

5. A method as in claim 4 in which the temperature attained by said metal upon reaching said die means is nearer to said recrystallization temperature than to said temperature at which said remelting of said metal will occur.

6. A method as in claim 3 or claim 4 in which said solidified metal is reduced in the course of said extruding thereof from its input cross-sectional area to an output cross-sectional area no less than 50% of said input area.

7. Apparatus for continuously casting and extruding material, the apparatus comprising:
- a first rotary member having an annular groove in a radially extending first surface thereof;
- a second rotary member having a radially extending second surface so disposed adjacent to said radially extending first surface of the first rotary member as to enclose a portion of said annular groove, thereby defining a region of overlap between the second rotary member and the annular groove;
- first means, disposed at a feeding station, for introducing the material in molten condition into said annular groove;
- second means for rotating the first and second rotary members simultaneously, about two different axes, in such direction as to transport the molten material within said annular groove from said feeding station and partly through said region;
- third means for cooling the material in said annular groove so as to render such material in a solidified condition in the course of such transportation thereof; and
- an extrusion die disposed in said groove with at least part thereof being within said region of overlap and adapted to extrude said material in response to continuing rotation of such two members causing the extrusion of the material from said annular groove in a solidified condition through said die.

8. Apparatus as set forth in claim 7, said elongated product being rosin-cored solder, said molten material being molten solder, and said die aperture being so configured as to form an elongated tube of solidified solder, the combination further comprising:
- fourth means for applying a cooling medium internally to at least one of said first and second rotary members so as to remove heat from said region of overlap while heating the cooling medium;
- fifth means for applying said heated cooling medium to a rosin material so as to remove heat from the cooling medium while maintaining the rosin material in a molten condition; and
- sixth means, located in the vicinity of said die, for introducing said molten rosin material into the interior of said tube of solidified solder.

9. Apparatus for casting and extruding metal comprising: metal transport means having an elongated outwardly open cavity defined in a surface thereof, a portion of said open cavity defining an outwardly open mold cavity, said metal transport means being movable in a predetermined path; means associated with said metal transport means and said mold cavity for feeding molten metal into said mold cavity at a site along said outwardly open cavity; movable enclosing means disposed adjacent said metal transport means and cooperating with said metal transport means to function as a movable closure for a region of said outwardly open cavity including the site, the mold cavity and a portion of the open cavity extending downstream of the site and mold cavity defining an extruder feed chamber for receiving metal exiting from said mold cavity; a stationary die at least partially mounted in said outwardly open cavity and having a stem portion extending rearwardly therefrom and into said extruder feed chamber; drive means coupled to said metal transport means for moving said mold cavity along said path to convey metal in said mold cavity to said extruder feed chamber and then into said die; and cooling means associated with said metal transport means and said mold cavity for fully solidifying the molten metal within said cavity; said drive means being further coupled to said closure means for effecting, within said region, movement of the closure means with said metal transport means; said drive means, metal transport means and movable closure cooperating to produce pressure in said extruder feed chamber causing extrusion of said solidified metal through said stationary die.

10. Apparatus as in claim 9 in which said outwardly open mold cavity and said predetermined path of movement thereof are closed upon themselves, said enclosing means extends wholly around a path of movement thereof which is closed upon itself, and said apparatus is adapted to operate continuously over an indefinite time period to provide continuous casting and extrusion of said metal during said period.

11. Apparatus as in claim 9 or claim 10 in which said mold and closure are of arcuate shape over an extent of said region so as to render said extrusion chamber of arcuate shape over such extent.

12. Apparatus as in claim 9 further comprising force biasing means coupled with said transport means and enclosing means for preloading the latter by compressive force exerted within said region and urging said closure towards said mold cavity.

13. Apparatus as in claim 12 in which said force biasing means comprises compression spring means.

* * * * *